United States Patent [19]

Yoshimura et al.

[11] 3,927,200

[45] Dec. 16, 1975

[54] STABILIZATION OF MICROORGANISM CELLS LYTIC ENZYME

[75] Inventors: Yoshio Yoshimura, Nishinomiya; Kanae Yokogawa, Nara; Shigeo Kawata, Kobe, all of Japan

[73] Assignee: Dainippon Pharmaceutical Co., Ltd., Osaka, Japan

[22] Filed: Apr. 20, 1973

[21] Appl. No.: 353,570

[30] Foreign Application Priority Data

Apr. 22, 1972    Japan.................................. 47-40805

[52] U.S. Cl. ...................... 424/50; 195/63; 195/68; 195/65; 426/12; 426/7
[51] Int. Cl.² ..................... A61K 7/28; C12D 13/10
[58] Field of Search ............. 195/63, 68, 65; 424/50

[56] References Cited

UNITED STATES PATENTS

| | | | |
|---|---|---|---|
| 2,164,936 | 7/1939 | Miller et al. | 195/68 |
| 2,689,203 | 9/1954 | Lolli | 195/63 |
| 3,590,121 | 6/1971 | Schiff et al. | 424/50 |
| 3,733,399 | 5/1973 | Becker et al. | 424/50 |

OTHER PUBLICATIONS

Sugimoto, Agricultural and Biological Chemistry, Vol. 31, No. 10, pp. 1111–1123, (1967).

*Primary Examiner*—Lionel M. Shapiro
*Attorney, Agent, or Firm*—Stevens, Davis, Miller & Mosher

[57] ABSTRACT

Method for stabilization of a microorganism cells lytic enzyme by admixing with at least one of stabilizers selected from carboxymethyl cellulose or its sodium salt, glycerin and monoethanolamine, and stable compositions containing the enzyme and the stabilizer; said microorganism cells lytic enzyme obtained by cultivation of a microorganism of the genus Streptomyces, e.g., S-1 strain (*Streptomyces diastatochromogenes*; ATCC No. 21481), H-191 strain (*Streptomyces farinosus*; ATCC No. 21842), H-402 strain (*Streptomyces griseus* var. H-402; ATCC No. 21843) and B-1829 strain (*Streptomyces globisporus*; ATCC No. 21553).

9 Claims, No Drawings

STABILIZATION OF MICROORGANISM CELLS LYTIC ENZYME

The present invention relates to a method for stabilizing a microorganism cells lytic enzyme and stable compositions containing the enzyme and a stabilizer. More particularly, it relates to a method for stabilizing an enzyme capable of lysing cells of microorganisms, especially dental caries-inducing microorganisms of the genus Streptococcus such as cariogenic streptococci (e.g., *Streptococcus mutans* or *Streptococcus salivarius*), and stable compositions containing the enzyme and a stabilizer.

It had been previously studied to find out a microorganism capable of producing a lytic enzyme on the cells of dental caries-inducing microorganisms in nature and then there had been found out some microorganisms of the genus Streptomyces, e.g., S-1 strain (*Streptomyces diastatochromogenes:* ATCC No. 21481, FERM-P No. 326), H-191 strain (*Streptomyces farinosus:* ATCC No. 21482, FERM-P No. 327), H-402 strain (*Streptomyces griseus var. H*-402: ATCC No. 21483, FERM-P No. 328) and B-1829 strain (*Streptomyces globisporus:* ATCC No. 21553, FERM-P No. 596), in which ATCC means American Type Culture Collection, U.S.A. and FERM means Fermentation Research Institute, Agency of Industrial Science and Technology, Japan.

These microorganisms of the genus Streptomyces are able to produce an enzyme capable of lysing cells of dental caries-inducing microorganisms by cultivation in a suitable culture medium. This obtained ennzyme is useful for prevention and treatment of dental caries and therefore can be admixed with various conventional carriers, such as water, toothpaste, tooth powder, ointment and the like to give compositions for preventing and treating dental caries. Furthermore, the present enzyme shows lytic activity on the cells of other microorganisms and is useful for inhibiting propagation of microorganisms in other fields, for instance, as an antiseptic for wines and foods.

However, the present enzyme is unstable to heat and, for example, it lost the most activity when the aqueous solution thereof was kept at 80°C for 20 minutes and lost about 80 % of the activity when it was kept at 55°C for 20 minutes. Furthermore, when the enzyme or compositions thereof are preserved at room temperature for a long time, the enzyme will be gradually inactivated. Thus, the present enzyme is very unstable and therefore the unit of the enzyme will be lowered in the preparation step of the compositions containing the enzyme or in the preservation of the compositions. In view of these disadvantages, it has been studied to find out a stabilizer suitable for stabilizing the present enzyme and then it has been found out that some stabilizers are useful for the purpose.

An object of the present invention is to provide a method for stabilizing a microorganism cells lytic enzyme which is obtained by cultivating a microorganism of the genus Streptomyces.

Another object of the present invention is to provide a stable enzyme solution or powder containing the aforesaid enzyme and a stabilizer.

A further object of the present invention is to provide stable compositions for preventing and treating dental caries containing the aforesaid enzyme and a stabilizer in admixture with a carrier.

These and other objects will be apparent from the description hereinafter.

As the results of hard study for a long time, it has now been found that the present enzyme or compositions thereof can be made stable by admixing therewith at least one of the stabilizers selected from carboxymethyl cellulose or its sodium salt (hereinafter, referred to as merely "CMC"), glycerin and monoethanolamine.

According to the present invention, when a microorganism cells lytic enzyme produced by cultivation of a microorganism of the genus Streptomyces or a composition containing said enzyme is admixed with at least one of the stabilizers selected from CMC, glycerin and monoethanolamine, it can be preserved in extremely stable state for a long time.

When CMC is used as the stabilizer, it is preferable to dissolve CMC in water together with the enzyme or in an enzyme-containing aqueous solution and then to remove water from the enzyme solution by lyophilization or the like to give a stable enzyme powder or solid enzyme-containing composition. Usually, an enzyme powder is dissolved in an aqueous solution of CMC in an appropriate concentration and the solution thus obtained is lyophilized to give a stable CMC-enzyme powder, and if desired, the powder is admixed with other carriers to give a stable enzyme-containing composition.

There is no particular limitation to the kind and quality of the CMC and various grades of CMC may be used, but a water-soluble one, especially its sodium salt is suitable one.

The proportion of CMC to the enzyme of the present invention may be enough to be about 0.3 or more parts by weight of CMC to one part by weight of the enzyme. The preferred proportion of CMC may be within a range of about 0.3 to about 5 parts, more preferably about 0.7 to about 2 parts by weight to one part by weight of the enzyme. When CMC is used in an amount less than the lower limit of the range, the desired stabilizing effect is not achieved, and on the other hand, when CMC is used over the upper limit of the range, the stabilizing effect is not increased and therefore it gives no further merit to use such much amount of CMC.

Glycerin and monoethanolamine are effective for stabilizing compositions of the enzyme in an aqueous state, for which they may be used either alone or together. For the preparation of a stable aqueous composition, glycerin and/or monoethanolamine are added to the enzyme-containing water, in which other components such as buffer (e.g., 0.02 M phosphate buffer) may be contained, and then the mixture is agitated well to give a homogenous solution. When monoethanolamine is added, it may be previously neutralized at pH about 6.3 to 7.0 by an acid such as acetic acid.

Glycerin is used within a range of about 45 to about 70 %, preferably about 50 to about 65 % by weight in concentration, and monoethanolamine is used within a range of about 10 to about 32 %, preferably about 20 to 30 % by weight in concentration. When they are used in a concentration out of the range, the desired stabilizing effect is not achieved.

The stable aqueous composition thus obtained may be preserved in high concentration, and when it is used, it is diluted with water and used as, for instance, mouth wash or rinse.

The stabilized enzyme powder or solution or the enzyme-containing compositions according to the present invention are extremely stable and can be stably preserved for a long time. For instance, even when the stabilized enzyme powder or enzyme-containing compositions are preserved at room temperature for about 1 year or more, the enzyme is little inactivated, and further even when they are preserved in a severe condition such as at an elevated temperature for several tens of hours to several days, they retain enough of the enzymatic activity.

The present invention is illustrated by the following examples but not limited thereto.

REFERENCE EXAMPLE

The isolated B-1829 strain was inoculated on a slant agar medium containing 1 % of glucose, 0.2 % of peptone, 0.1 % of yeast extract, 0.1 % of meat extract and 1.5 % of agar and cultivated at 30°C for 7 days. The obtained spores were inoculated into a 500 ml Sakaguchi flask including 50 ml of liquid medium (pH 7.5) containing 2 % of dextrin, 0.5 % of soybean powder, 0.25 % of peptone, 0.5 % of disodium hydrogen phosphate, 0.1 % of potassium dihydrogen phosphate, 0.1 % of magnesium sulfate and 0.5 % of sodium chloride and subjected to shaking culture at 30°C for 3 days. The culture broth thus obtained was separated by filtration to give 49.5 ml of enzyme solution. The enzyme solution was absorbed onto Amberlite IRC 50 (an ion-exchange resin, made by Rohm and Haas Co., U.S.A.) and eluted with 0.2 M sodium dihydrogen phosphate (pH 7.5) and salted out by saturating with ammonium sulfate so as to be 60 % saturation. The resulting precipitate was collected and dissolved in water and dialyzed against running water and then lyophilized to give 10 mg of enzyme powder.

In the above procedure, by using the isolated S-1, H-191 or H-402 strain instead of the isolated B-1829 strain, the desired enzyme powder was likewise obtained.

The unit of lytic activity of the present enzyme is calculated according to the following method. 0.4 ml of a suspension of intact cells of microorganism of the genus Streptococcus, for example *Streptococcus mutans* BHT, 2 ml of an enzyme solution diluted in an appropriated concentration and 1.6 ml of 0.025 M tris-HCl buffer (pH 7.0) are mixed to give total 4 ml. The mixture is kept at 37°C for 5 minutes to subject to the cell-lytic reaction. Then, the optical density of the reaction mixture is measured at 600 mµ of a photoelectric colorimeter and the unit of lytic activity of the present enzyme is calculated according to the following equation. As a control, 2 ml of water is used instead of 2 ml of the enzyme solution.

$$\text{Unit/ml or mg} = \frac{(a-b)-(a-c)}{0.001 \cdot t \cdot v} = \frac{c-b}{0.001 \cdot t \cdot v}$$

$a$: Optical density of the reaction mixture at 600 mµ at zero reaction time
$b$: Optical density of the reaction mixture at 600 mµ after $t$ time(s)
$c$: Optical density of the control solution at 600 mµ after $t$ time(s)
$t$: Reaction time (minute)
$v$: Amount (ml or mg) of actually used original enzyme solution or powder

EXAMPLE 1

In 1 ml of each aqueous solution (concentration: 0, 0.5, 1.0 and 3.0 % by weight) of sodium carboxymethyl cellulose [Celogen FSB (viscosity: 180 – 340 cps.), made by Dai-Ichi Kogyo Seiyaku Co., Ltd.] was dissolved 15 mg of the enzyme powder obtained by Reference Example and the mixture was lyophilized to give a sodium carboxymethyl cellulose-enzyme powder. The powder was allowed to stand at 80°C for 4 days and then measured the remaining activity of the enzyme. The results are shown in Table I.

Table I

| Concentration of aqueous sodium carboxymethyl cellulose solution (%) | Remaining activity of the enzyme* |
|---|---|
| 0 | 48.6 |
| 0.5 | 76.5 |
| 1.0 | 83.1 |
| 3.0 | 100.0 |

*): Activity of original powder before allowed to stand at 80°C = 100

EXAMPLE 2

To 1 g of paste base consisting of 5.0 parts by weight of Plastibase 50 W (dental paste base, made by E. R. Squibb & Sons, Inc.), 0.83 part by weight of gelatine and 0.415 part by weight of pectine was added the sodium carboxymethyl cellulose-enzyme powder obtained in the same manner as described in Example 1 so as to contain 10 mg of enzyme and the mixture was kneaded well to give an enzyme-containing paste. The paste was allowed to stand at 80°C for 4 days and then calculated the remaining activity of the enzyme. The results are shown in Table II.

Table II

| Period for allowing to stand (hour) | Concentration of aqueous sodium carboxymethyl cellulose solution (% by weight) | | |
|---|---|---|---|
| | 0.5 | 1.0 | 3.0 |
| 0 | 100.0 | 100.0 | 100.0* |
| 3.0 | 75.3 | 100.0 | 100.0 |
| 6.0 | 61.4 | 100.0 | 100.0 |
| 12.0 | 46.0 | 100.0 | 96.8 |
| 96.0 | 36.6 | 79.0 | 86.3 |

*):Remaining activity of the enzyme

EXAMPLE 3

In 1 ml of each aqueous solution of several concentrations of two kinds of sodium carboxymethyl cellulose [Terucello H (viscosity: 350 ± 40 cps.) and Terucello M (viscosity: 600 ± 50 cps.), made by Showa Jushi Kogyo K.K.] was dissolved 15 mg of enzyme powder obtained in the same manner as described in Reference Example and the mixture was lyophilized to give a sodium carboxymethyl cellulose-enzyme powder. The powder was allowed to stand at 80°C for 15 hours and then measured the remaining activity of the enzyme. The results are shown in Table III.

Table III

| Sodium carboxymethyl cellulose | | Remaining activity of the enzyme (%) |
|---|---|---|
| Kind | Concentration | |
| — | — | 82.2 |
| Terucello H | 0.5 | 117.4 |
| | 1.0 | 108.4 |

Table III-continued

| Sodium carboxymethyl cellulose | | Remaining activity of the enzyme (%) |
|---|---|---|
| Kind | Concentration | |
| Terucello M | 2.0 | 102.9 |
| | 0.5 | 95.6 |
| | 1.0 | 96.0 |
| | 2.0 | 95.5 |

EXAMPLE 4

In the same manner as described in Example 1, a sodium carboxymethyl cellulose-enzyme powder was obtained by using 1 ml of 1 % aqueous solution of sodium carboxymethyl cellulose (Terucello M, made by Showa Jushi Kogyo K.K.) and 15 mg of enzyme powder obtained in the same manner as in Reference Example. By using the sodium carboxymethyl cellulose-enzyme powder, a paste having the following prescription was prepared.

| | (mg) |
|---|---|
| Plastibase 50 W | 91.0 |
| Hydroxyethyl cellulose | 9.0 |
| Sodium carboxymethyl cellulose-enzyme powder | 2.7 |
| α-Soluble starch | 0.3 |
| Magnesium sulfate | 5.0 |
| Sodium saccharin | 0.7 |
| Coloring agent | slight amount |
| Flavor | slight amount |

The paste thus obtained was very stable, and even when it was preserved at a room temperature for 12 months, the activity of the enzyme did not lower.

EXAMPLE 5

In the same manner as described in Example 1, a sodium carboxymethyl cellulose-enzyme powder was obtained by using 1 ml of 3 % aqueous solution of sodium carboxymethyl cellulose (Celogen FSB, made by Dai-Ichi Kogyo Seiyaku Co., Ltd.) and 15 mg of the enzyme powder obtained in the same manner as in Reference Example. By using the sodium carboxymethyl cellulose-enzyme powder, a troche having the following prescription was prepared.

| | (mg) |
|---|---|
| Mannitol | 278.2 |
| Sodium carboxymethyl cellulose | 10.0 |
| Sodium carboxymethyl cellulose-enzyme powder | 3.0 |
| Magnesium sulfate | 5.0 |
| Magnesium stearate | 1.5 |
| Sodium saccharin | 0.3 |
| Flavor | slight amount |

The troche thus obtained was very stable, and even when it was preserved at a room temperature for 12 months, the activity of the enzyme did not lower.

EXAMPLE 6

By using a sodium carboxymethyl cellulose-enzyme powder obtained in the same manner as described in Example 4, an effervescent granule having the following prescription was prerpared.

| | (mg) |
|---|---|
| Tartaric acid | 125 |
| Sodium hydrogen carbonate | 188 |
| Magnesium sulfate | 12 |
| Mannitol | 412 |
| Lactose | 250 |
| Sodium saccharin | 5 |
| Levo-menthol | 5 |
| Sodium carboxymethyl cellulose-enzyme powder | 3.7 |

When the effervescent granule thus obtained was preserved at a room temperature for 12 months, the activity of the enzyme did not lower. The granule is dissolved in about 200 ml of water when used and then it is used as a mouth wash.

EXAMPLE 7

In 1 ml of 0.01 M phosphate buffer (pH 7.0) was dissolved 1 mg of the enzyme powder obtained by Reference Example and thereto was added glycerin so as to be in various concentrations as mentioned in the following Table IV. The mixture was diluted with water to make total 5 ml. The solution was allowed to stand at 60°C for 30 minutes and then the change of the remaining activity of the enzyme was measured. The results are shown in Table IV.

Table IV

| Concentration of glycerin (% by weight) | Period for allowing to stand (minute) | | | |
|---|---|---|---|---|
| | 0 | 10 | 20 | 30 |
| 0 | 100 | 30 | 5 | 2* |
| 10 | 100 | 43 | 24 | 15 |
| 20 | 100 | 56 | 31 | 25 |
| 30 | 100 | 60 | 36 | 31 |
| 40 | 100 | 63 | 39 | 34 |
| 50 | 100 | 73 | 69 | 59 |

*): Remaining activity of the enzyme

EXAMPLE 8

In water and/or 0.02 M phosphate buffer (pH 6.5) was dissolved the enzyme powder obtained by Reference Example (the enzyme was dissolved finally in an amount of 2 mg/ml). To the solution were added glycerin or a solution of monoethanolamine neutralized with acetic acid at pH about 6.5, and the mixture was well stirred to make a homogeneous solution. The proportion of the components was shown in the following Table V. The solution thus obtained was allowed to stand at 40°C or 50°C for 1 month and then the remaining activity of the enzyme was calculated. The results are shown in Table V.

Table V

| Components (part by weight) | | | | Remaining activity of the enzyme (%) | |
|---|---|---|---|---|---|
| Water | Phosphate buffer | Glycerin | Monoethanolamine | 40°C | 50°C |
| + (Control) | — | — | — | 17 | 0 |
| 30 | 15 | — | — | 25 | 0 |
| 50 | — | 50 | — | 81 | 55 |
| — | 15 | — | 10* | 80 | 66 |
| — | 15 | 30 | 10* | 90 | 79 |
| 30 | 15 | — | 10* | 100 | 62 |

*): 10 parts of acetic acid were used for the neutralization.

EXAMPLE 9

In 10 ml of 0.01 M phosphate buffer (pH 7.0) was dissolved 50 mg of the enzyme powder obtained by Reference Example and thereto was added glycerin so as to be in various concentrations as mentioned in the following Table VI. The mixture was allowed to stand at 60°C for 20 minutes, and then the remaining activity of the enzyme was measured. The results are shown in Table VI.

Table VI

| Concentration of glycerin (% by weight) | Remaining activity of the enzyme |
| --- | --- |
| 0 | 9.6 |
| 20 | 25.2 |
| 33 | 48.9 |
| 42.8 | 44.6 |
| 50 | 67.8 |
| 55.6 | 67.8 |
| 60 | 84.4 |
| 63.6 | 76.0 |
| 67 | 63.7 |
| 70 | 60.0 |

EXAMPLE 10

In 10 ml of 0.01 M phosphate buffer (pH 7.0) was dissolved 50 mg of the enzyme powder obtained by Reference Example and thereto was added monoethanolamine so as to be in various concentrations as mentioned in the following Table VII. The monoethanolamine was neutralized with acetic acid of the proportion of 1 : 1 by weight. The mixture was allowed to stand at 60°C for 20 minutes, and then the remaining activity of the enzyme was measured. The results are shown in Table VII.

Table VII

| Concentration of monoethanolamine (% by weight) | Remaining activity of the enzyme |
| --- | --- |
| 0 | 9.6 |
| 10 | 67.8 |
| 16.5 | 71.4 |
| 21.4 | 78.0 |
| 25 | 76.9 |
| 27.8 | 89.5 |
| 30 | 88.1 |
| 31.8 | 60.6 |
| 33.5 | 42.1 |

EXAMPLE 11

In 10 ml of 0.01 M phosphate buffer (pH 7.0) was dissolved 50 mg of the enzyme powder obtained by Reference Example and thereto was added glycerin so as to be 60 % by weight in concentration or monoethanolamine so as to be 30 % by weight in concentration. The mixture was stirred well and allowed to stand at room temperature for about one year, and then the remaining activity of the enzyme was measured. About 100 % of the activity was retained in each mixture.

What is claimed is:

1. A method for stabilizing an enzyme which is capable of lysing cells of cariogenic streptococci, said enzyme being one obtained by cultivating a microorganism selected from the group consisting of *Streptomyces diastatochromogenes* (ATCC No. 21481), *Streptomyces farinosus* (ATCC No. 21482), *Streptomyces griseus var. H-402* (ATCC No. 21483) and *Streptomyces globisporus* (ATCC No. 21533), said method comprising admixing the enzyme or the enzyme-containing composition with at least one stabilizer selected from the group consisting of carboxymethyl cellulose, a sodium salt of carboxymethyl cellulose, glycerin and monoethanolamine, the amount of said carboxymethyl cellulose or its sodium salt being within the range of about 0.3 to about 5 parts by weight to one part by weight of the enzyme, said glycerin being in a concentration within the range of about 45 to about 70% by weight and said monoethanolamine being in a concentration within the range of about 10 to about 32% by weight.

2. The method according to claim 1, wherein the stabilizer is carboxymethyl cellulose or its sodium salt.

3. The method according to claim 1, wherein the stabilizer is glycerin or monoethanolamine.

4. The method according to claim 3, wherein the monoethanolamine is used in a concentration of the range of about 10 to about 32 % by weight.

5. The method according to claim 3, wherein the glycerin and monoethanolamine are used together with each other.

6. A solid state, stable composition comprising one part by weight of an enzyme which is capable of lysing cells of cariogenic streptococci which is obtained by cultivating a microorganism selected from the group consisting of *Streptomyces diastatochromogenes* (ATCC No. 21481), *Streptomyces farinosus* (ATCC No. 21482), *Streptomyces griseus var. H-402* (ATCC No. 21483) and *Streptomyces globisporus* (ATCC No. 21533) and about 0.3 to about 5 parts by weight of carboxymethyl cellulose or its sodium salt.

7. A stable aqueous composition comprising an enzyme which is capable of lysing cells of cariogenic streptococci which is obtained by cultivating a microorganism selected from the group consisting of *Streptomyces diastatochromogenes* (ATCC No. 21481), *Streptomyces farinosus* (ATCC No. 21482), *Streptomyces griseus var. H-402* (ATCC No. 21483) and *Streptomyces globisporus* (ATCC No. 21533) and glycerin having a concentration of about 45 to about 70% by weight.

8. A stable aqueous composition comprising an enzyme which is capable of lysing cells of cariogenic streptococci which is obtained by cultivating a microorganism selected from the group consisting of *Streptomyces diastatochromogenes* (ATCC No. 21481), *Streptomyces farinosus* (ATCC No. 21482), *Streptomyces griseus var. H-402* (ATCC No. 21483) and *Streptomyces globisporus* (ATCC No. 21533) and monoethanolamine having a concentration of about 10 to about 32% by weight.

9. A stable composition for preventing and treating dental caries comprising as an essential active ingredient an enzyme which is capable of lysing cells of cariogenic streptococci which is obtained by cultivating a microorganism selected from the group consisting of *Streptomyces diastatochromogenes* (ATCC No. 21481), *Streptomyces farinosus* (ATCC No. 21482), *Streptomyces griseus var. H-402* (ATCC No. 21483) and *Streptomyces globisporus* (ATCC No. 21533) and as a stabilizer at least one of stabilizers selected from the group consisting of carboxymethyl cellulose or its sodium salt, glycerin and monoethanolamine in admixture with a carrier selected from water, toothpaste, tooth powder or ointment.

* * * * *